United States Patent
Rosenzweig

[19]

[11] Patent Number: 5,963,215
[45] Date of Patent: Oct. 5, 1999

[54] THREE-DIMENSIONAL BROWSING OF MULTIPLE VIDEO SOURCES

[75] Inventor: Michael D. Rosenzweig, Hillsboro, Oreg.

[73] Assignee: Intel Corporation, Santa Clara, CA

[21] Appl. No.: 08/824,531

[22] Filed: Mar. 26, 1997

[51] Int. Cl.[6] .................................................. G06T 3/00
[52] U.S. Cl. ............................................................. 345/437
[58] Field of Search .................................. 345/437, 419, 345/433, 435, 420, 348–351

[56] References Cited

U.S. PATENT DOCUMENTS 5,452,414  9/1995  Rosendahl et al. ...................... 395/159
5,485,197  1/1996  Hoarty ........................................ 348/7

*Primary Examiner*—Almis R. Jankus
*Attorney, Agent, or Firm*—Blakely, Sokoloff, Taylor & Zafman LLP

[57] ABSTRACT

A browsing system for multimedia uses a polyhedron to display multiple multimedia sources simultaneously. A user or software can rotate the browse polyhedron to make visible faces of the polyhedron which are hidden and can rotate the polyhedron to change the orientation of visible faces. On each face, the system renders a different video stream from the multimedia data source based on the orientation.

16 Claims, 11 Drawing Sheets

THREE-DIMENSIONAL BROWSING OF MULTIPLE VIDEO SOURCES

BACKGROUND OF THE INVENTION

1. Field of the Invention

The invention relates to the field of multimedia interfaces. More specifically, the invention is directed at methods for simultaneous viewing of multiple multimedia data sources.

2. Description of Related Art

It is difficult for the human eye to attentively view multiple video streams simultaneously, whether on one display screen or several. One development in this area is Picture-In-Picture (PIP) where several separately tuned sources of video (e.g. television broadcasts, VHS output) are placed on a single television screen for simultaneous viewing. With PIP, the user is able to view one video stream on one window and another video stream on another window simultaneously on a single screen. While PIP works for a small number of video streams, when the number increases even slightly, the PIP becomes less effective because the display screen will quickly fill up. On computer systems, likewise, separate windows may be opened for each of several video streams, but would suffer the same shortcomings as PIP in terms of occupying more screen area for each new video source displayed. Further, none of the current multiple window video techniques allow for browsing of multiple video sources so that the video sources displayed can be dynamically selected and viewed with three-dimensional perspective to more efficiently use screen area.

Also, when video streams are simultaneously accompanied by related audio streams, the browsability of the audio with the video declines, especially since typical computer systems are not capable of separating multiple audio streams for the benefit of the user. The overall result is that multiple multimedia data sources, which may have both video and audio streams such as an MPEG-2 (Motion Pictures Experts Group), also known as the ISO/IEC (International Standards Organization/International Electrotechnical Committee) 13 818 standard, when simultaneously listened to create overlapping and consequently jumbled output such that the reception of particular audio to the human ear is unable to be matched with its accompanying video stream.

Therefore, there is a need to more adequately and efficiently browse, render and play multiple video and audio streams of multimedia sources on a single display.

SUMMARY

The invention provides a method and apparatus for rendering and browsing multimedia data. The multimedia data are rendered selectively in a plurality of areas of a display screen. The plurality of areas form a browse polyhedron, with the rendering achieved in accordance with the spatial orientation of the browse polyhedron. The rendering is repeatedly performed in response to changes in the spatial orientation.

In another embodiment, the invention provides a system for browsing the multimedia data by providing a user interface which changes the spatial orientation of the browse polyhedron, and consequently, the selection of the multimedia data viewed.

DETAILED DESCRIPTION OF THE INVENTION

Figure 1:
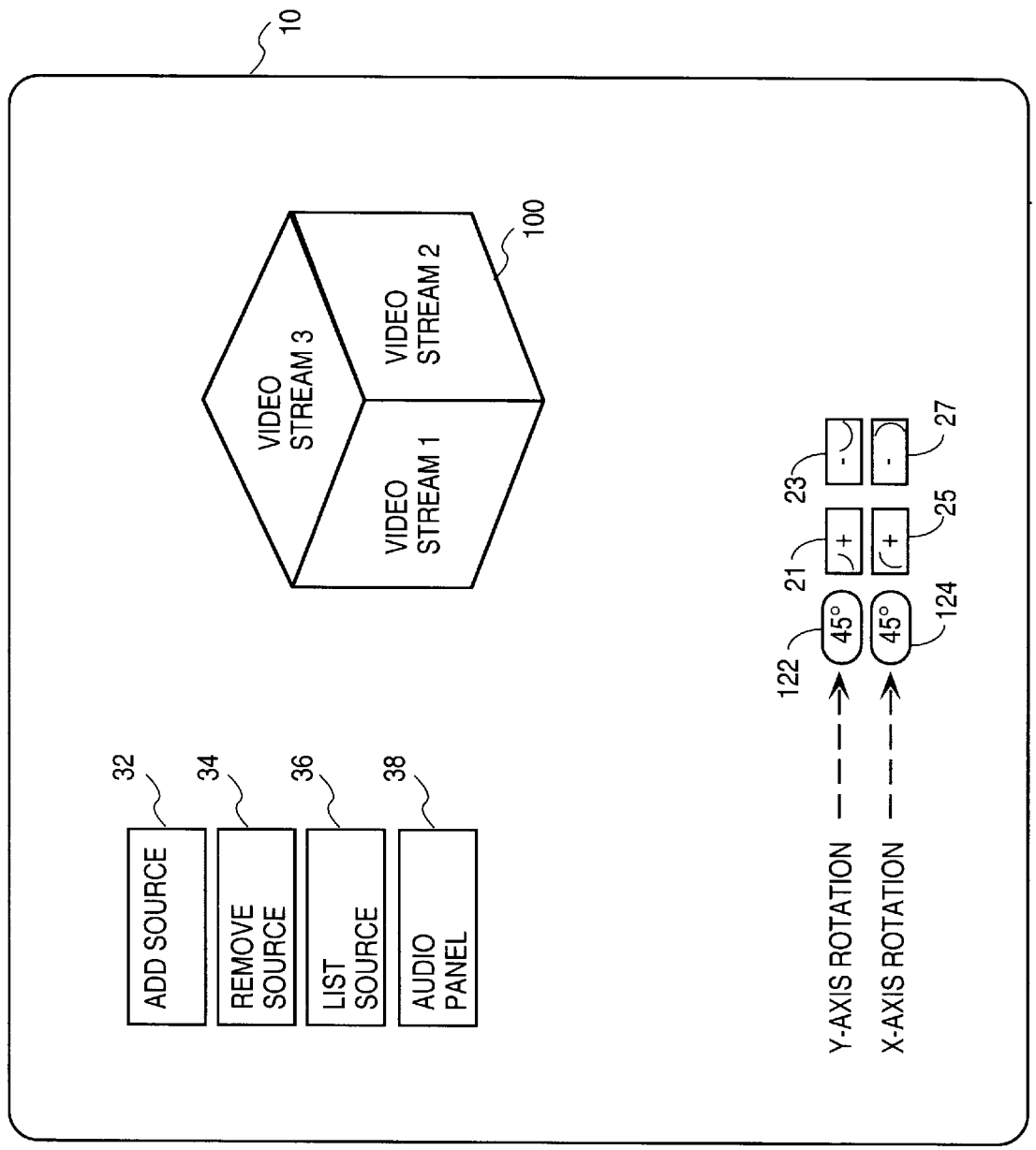
FIG. 1 is an illustration of the display screen for a browsing system for multiple video streams according to one embodiment of the invention.

FIG. 1 is an illustration of the display screen for a browsing system for multiple video streams according to one embodiment of the invention.

FIG. 1 shows a display screen 10 which can be, for instance, the display monitor of a computer system which outputs pixels of graphical information for viewing. In this embodiment, a browse polyhedron 100, which is a cube consisting of three visible faces and three other hidden faces, is shown at a predetermined initial spatial orientation. The rotational indicators 122 and 124 at the bottom left hand corner of the display 10 indicate that the browse polyhedron 100 is rotated about the y-axis 45 degrees down and about the x-axis 45 degrees left. The x-axis and y-axis rotation values vary from +180 degrees to −180 degrees, with a positive value indicating a down rotation about the x-axis and a left rotation about the y-axis. For a discussion of the origin and other definitions, please refer to FIG. 2 and the associated description. The browse polyhedron 100 has the initial spatial orientation shown in FIG. 1 to give approximately even display screen area to each of the three visible faces, so that their assigned video streams may be uniformly displayed.

Before a screen such as that shown in FIG. 1 can be constructed by the browsing system, one or more multimedia sources with video streams should first be available to the browsing system. These video streams rather than being static images such as GIF (Graphics Interchange Format) or JPEG (Joint Photographic Experts Group) images, are streamed video from multimedia sources such as an AVI (Audio Video Interleave), NTSC (National Television Standards Committee) output from a VHS (Video Home System) source or a live broadcast such as from a television tuner or video conferencing session. To control which video streams are displayed by the browser, the user interface portion of the browsing system is shown to have buttons 32, 34, 36 and 38. An "Add Source" button 32 can be invoked by the user to add an additional video stream (multimedia source) to be browsed on the polyhedron. If a user wishes to remove a particular video stream, he may invoke the "Remove Source" button 34 which eliminates a particular multimedia source (and thus its video stream) from the browsing system. To list which video streams are currently browsable by the browsing system, the user may invoke the "List Sources" button 36. If the user wishes to configure the properties of an audio stream that accompanies these video streams in a multimedia data source, the user can invoke the "Audio Panel" button 38 (the audio localization features of the invention are described later).

Once one or more multimedia sources have been added either by the user or by a function call from an application program, each of the video streams from those sources is assigned a particular face of the browse polyhedron 100. In the case of a cube as the browse polyhedron, only three faces can be visible at any one time if the cube is to retain its geometric trueness. With only three visible faces, thus, only three of the multimedia sources can be displayed on the screen at any one time. However, since a cube has six faces the invention allows modifying the spatial orientation of the cube such that different faces than those shown on FIG. 1 may become wholly or partially visible. By rotating the cube a sufficient amount in the right and left (rotation about the y-axis) or up and down (rotation about the x-axis) directions, the user will be able to browse all six multimedia sources, up to three at a time.

When the user adds a multimedia source as described earlier, the video stream of that source is assigned to one of the faces. To initialize the browsing mode, a first video stream, video stream 1 has been assigned to a face 1 of the browse polyhedron 100 and a video stream 2 has been assigned to face 2 of the browse polyhedron and a video stream 3 has been assigned to face 3 of the polyhedron. While in the browsing mode, each of the video streams, video stream 1, video stream 2, and video stream 3, are all performing their streaming operations in a concurrent fashion such that, depending on the capability of the processor of the computer system to which the display 10 is connected and the capability of the bus and I/O subsystem, a steady frame rate may be maintained amongst the three video streams.

Thus, on face 1, the browsing system displays the frames of video for video stream 1, on face 2, the frames of video for video stream 2, and on face 3, the frames of video for video stream 3. If any more than one of the video streams is to be a broadcast or "live" stream, i.e., not generated from files stored on magnetic media or on a VHS tape, a separate tuner would be desired for each such source of video as well as either multiple video controllers or a single video controller which is capable of multiplexing the output of more than one video stream. For AVI (Audio Video Interleave) and MPEG (Motion Pictures Entertainment Group) files stored locally or available on a remote server, though there may be serious performance constraints on the ability of the computer to adequately update the frames, there is no additional hardware needed for the typical computer system to employ a browsing system according to the invention.

As specified earlier, the browsing system sets an initial spatial orientation for the browse polyhedron 100 and indicates this to the user by showing that all of the rotation angles are 45 degrees. Adjacent to each angle indicator on display 10 is also a set of four command input buttons or selection devices 21, 23, 25, and 27. The command input buttons allow a user to select up, down, left, and right angular rotations for the browse polyhedron, such that certain video streams will experience a loss in visibility either partially or completely while other video streams may suddenly become visible either partially or completely. A small angular rotation such as a rotation of, for instance, one degree to the right while having no effect on which video streams would be displayed would still impact the rendering of the video streams on each of the faces since, due to the rotation, face 2 would occupy less area on display 10 while face 1 would become more centralized and prominent. The browsing system is considered initialized when at least one or more video streams have been assigned and when the system has begun displaying (decompressing and rendering) these video streams.

Though FIG. 1 shows the browse polyhedron 100 to be a cube, which only allows a maximum of six video streams (one video stream for each face), if the users were to add a seventh and eighth video stream, for example, rather than show a cube as the browse polyhedron 100, an octahedron may be displayed as the browse polyhedron 100. To allow the user to change the spatial orientation of the cube, the rotation may be achieved by the user clicking the buttons 21, 23, 25 and 27 using an input device, such as a mouse or a keyboard. The button 21 will, when activated, by some fixed increment, rotate the polyhedron 100 to the left. The activation of button 21 will increase the y-axis rotation angle. The button 23 will, when activated, by some fixed increment, rotate the polyhedron 100 to the right. The activation of button 25 will decrease the y-axis rotation angle. The button 25 will, when activated by some fixed increment, rotate the polyhedron 100 downwards. The activation of button 21 will also increase the x-axis rotation angle. The button 27 will, when activated, by some fixed increment, rotate the polyhedron 100 upwards. The activation of button 25 will also decrease the x-axis rotation angle.

Alternatively, the user may type the number of degrees for the angular rotation or even, in another embodiment, select from a predefined set of angular rotations, which allow for optimal browsing of the video streams.

Further, the browsing is capable of recognizing whether a video stream would be rendered upside-down or adhered to if the angular rotations were strictly adhered to and thus, also orients the texture map right-side up for the user to properly view. Alternatively, the user may wish to view the stream upside down, in which case no adjustment to the orientation would be made.

Figure 2:
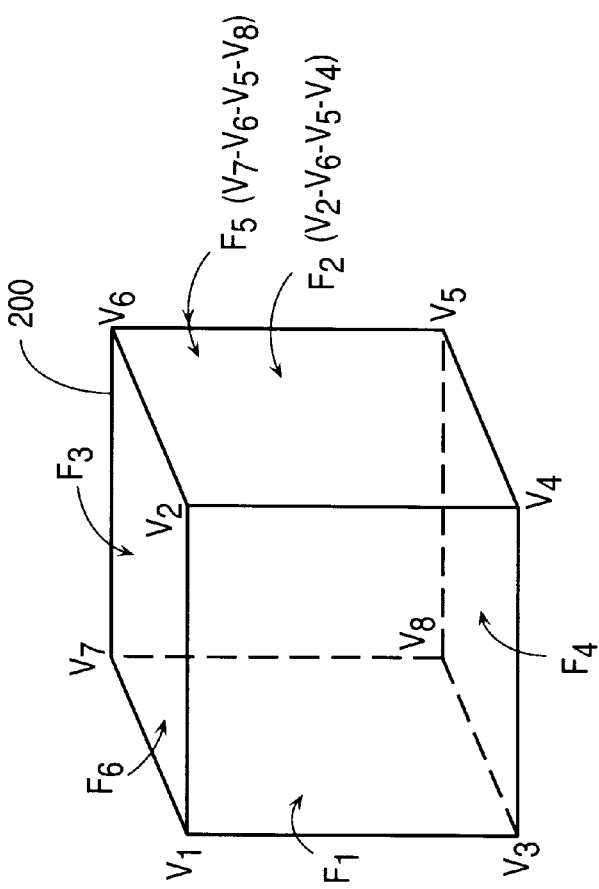
FIG. 2 shows conventions and reference orientation for a browse polyhedron and a multimedia assignment table according to the various embodiments of the invention.
Figure 2:
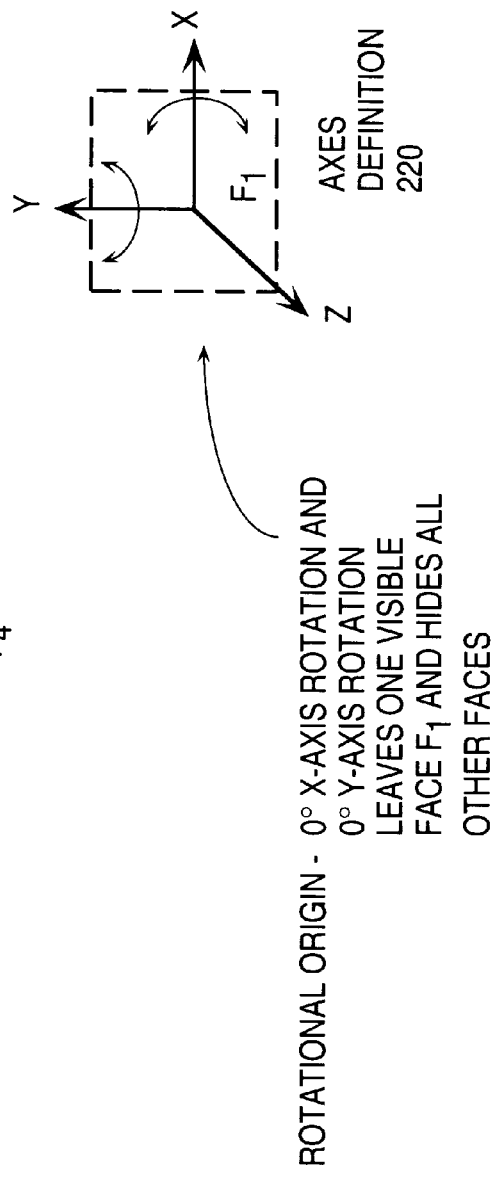

FIG. 2 shows conventions and reference orientation for a browse polyhedron and a multimedia assignment table according to the various embodiments of the invention.

Browse polyhedron 200 of FIG. 2, though shown as a cube, may, in fact, be any polyhedron such as an octahedron with eight sides or a dodecahedron with 10 sides and is merely exemplary of possible browse polyhedrons. In general, a browse polyhedron will have F faces and V vertices, each vertex defined by an (x,y,z) coordinate (see AXES DEFINITION 220). Polyhedron 200 is a cube having six faces—$F_1$, $F_2$, $F_3$, $F_4$, $F_5$ and $F_6$. The cube or "mesh" can also be described by eight unique vertices $V_1$, $V_2$, $V_3$, $V_4$, $V_5$, $V_6$, $V_7$ and $V_8$. Each face is defined by four vertices. The visible faces (all edges not dashed) for polyhedron 200 in the orientation shown are face $F_1$, which is defined by vertices $V_1$, $V_2$, $V_3$ and $V_4$, face $F_2$ defined by vertices $V_2$, $V_6$, $V_4$ and $V_5$, while face $F_3$ is defined by the vertices $V_7$, $V_6$, $V_1$ and $V_2$. The faces shown as hidden in this orientation (having some dashed edges) are $F_4$, defined by vertices $V_8$, $V_5$, $V_3$ and $V_4$, face $F_5$, defined by vertices $V_7$, $V_6$, $V_8$ and $V_5$ and face $F_6$, defined by $V_1$, $V_7$, $V_3$ and $V_8$. Vertex $V_8$ is shown as a hidden vertex in this orientation. In general, each vertex $V_n$ will have spatial coordinates ($V_{nx}$, $V_{ny}$, $V_{nz}$) throughout the description of the invention though not specifically so designated.

In this regard, also defined in FIG. 2 is the AXES DEFINITION 220 used throughout the description of the invention. The virtual three-dimensional plane in which the browse polyhedron is manipulated has three axes x, y and z such that the x axis is the horizontal axis, the y axis is the vertical axis, and the z axis is orthogonal to both the x and y axes. In describing this invention, a rotational origin is also defined for a browse polyhedron. The user/software will be able to browse all the faces of the polyhedron by rotating it about any two of the three axes. For convenience, the invention in one embodiment allows the user to rotate the polyhedron about the x-axis or about the y-axis. A third axis of movement or rotation can be defined so that the polyhedron is moved forward and back. The rotational origin is defined as 0 degrees x-axis rotation and 0 degrees y-axis rotation and would show, if mapped to a two dimensional display screen, one and only one visible face F1. The angle pair [m,k] will be used hereinafter to designate a rotation of m degrees about the x-axis and a rotation of k degrees about the y-axis. As mentioned earlier, a positive angular rotation indicates a downward rotation of the polyhedron about the x-axis and a leftward rotation of the polyhedron about the y-axis. Using the coordinates of the rotated vertices, the browsing system will be able to determine which of the faces are visible and also by their rotation how the frames of video should be rendered upon the display screen. When the rotational angle(s) are modified, the browsing system will use these angles to re-compute which faces are visible and render as an animated texture the corresponding video stream for each visible face.

In this regard, an initial assignment for each face is shown in multimedia assignment table 250 of FIG. 2. Face $F_1$ renders video stream 1, Face $F_2$ renders video stream 2, face $F_3$ renders video stream 3, face $F_4$ renders video stream 4 and face $F_5$ renders video stream 5. Face $F_6$ is initially unassigned to any video stream but when a sixth stream is desired, $F_6$ will be so assigned. To attain a computationally efficient and pleasing geometry, a cube is chosen as the browse polyhedron in one embodiment of the invention. The rotational origin can be used as a "virtual" camera which is a viewpoint reference for the geometrical computation used to compute the visibility of faces and display (texture map) the video streams assigned to those faces.

Figure 3:
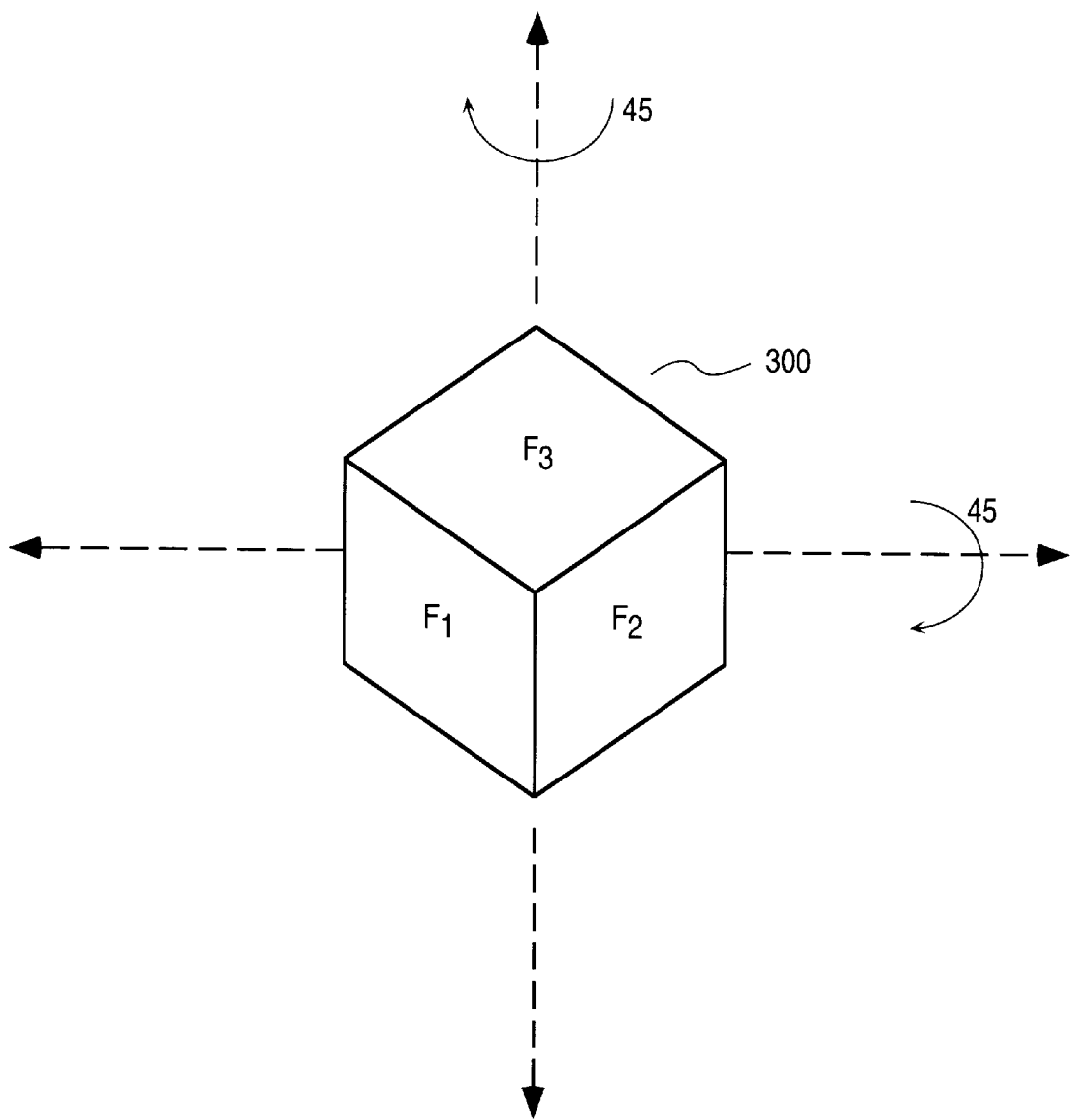
FIG. 3 shows a first orientation of a browse polyhedron.

FIG. 3 shows the browse polyhedron in a first spatial orientation.

FIG. 3 shows a polyhedron in an orientation 300 which has rotation values of 45 degrees about the x-axis and 45 degrees about the y-axis. According to the convention described above, the polyhedron is rotated from the position of rotational origin by 45 degrees down and 45 degrees left. According to the invention, given these two rotation angles, in order to render the video streams shown in FIG. 3 with that orientation, the vertices from the rotational origin should be transformed and certain geometric transforms performed to discover which faces are visible. Then, the video stream assigned to the visible faces is looked up in the multimedia assignment table. In this orientation, faces $F_1$, $F_2$ and $F_3$ are visible, and consequently, video stream 1, 2 and 3 are texture mapped upon those faces, respectively. With a [45,45] rotation, orientation 400 distributes evenly, display screen real estate to each of the visible faces $F_1$, $F_2$ and $F_3$, though in the perspective illustrated in FIG. 3, face $F_3$ would seem to appear to be more prominent than the other faces. The "visibility" of each face in a particular orientation refers to the percentage of two-dimensional screen area the faces occupy. Further, according to the invention, in this orientation, faces $F_4$, $F_5$ and $F_6$ are hidden from view, and thus, their video streams are not rendered. The operation of determining the visibility of the faces using two rotational angles is discussed below.

Figure 4:
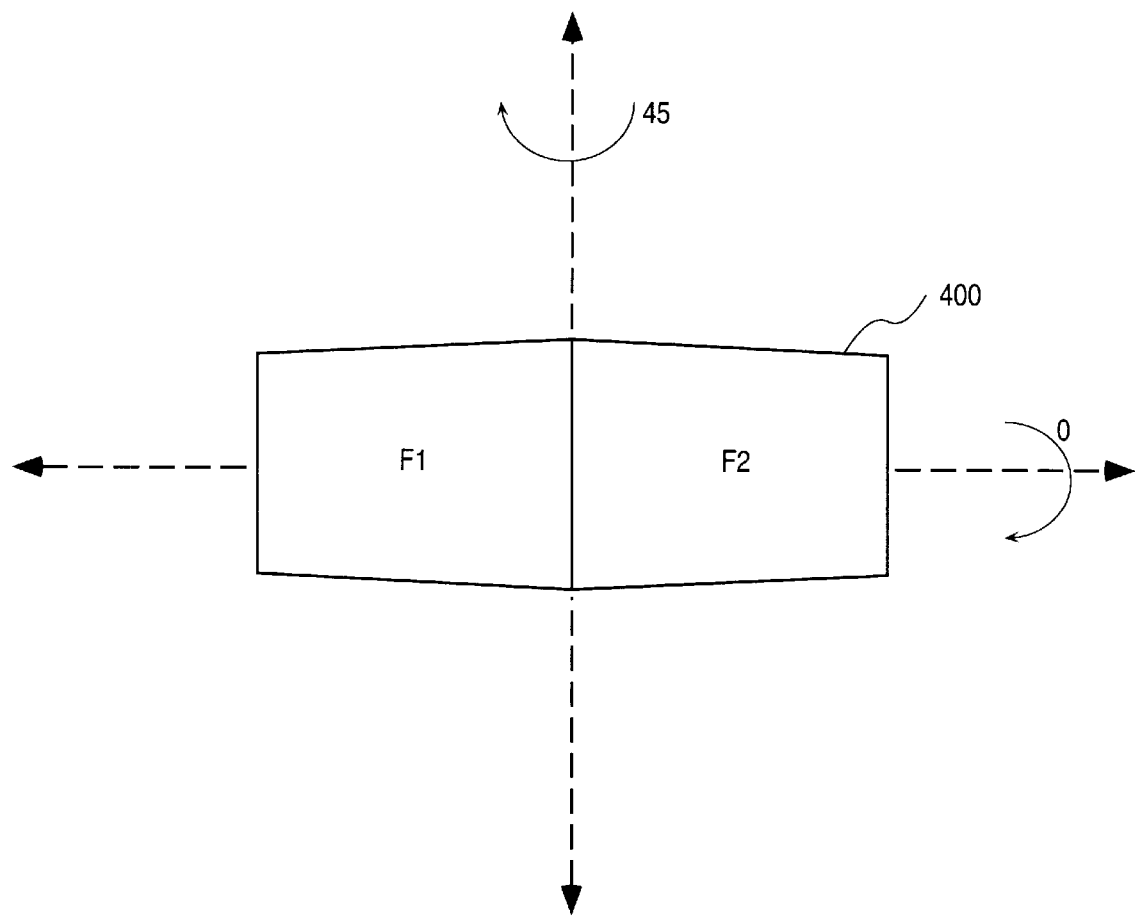
FIG. 4 shows a second orientation of a browse polyhedron.

FIG. 4 shows an orientation 400 where a rotational angle of 45 degrees left-wise about the y-axis is maintained without modification, but where the rotation about the x-axis has been modified from 45 degrees downward to zero degrees. The user/software, if starting previously from the orientation 300 of FIG. 3, would need to rotate the cube 45 degrees upward from orientation 300 to achieve orientation 400. In orientation 400 of [0,45], only faces $F_1$ and $F_2$ are visible, while all other faces are hidden. Thus, only the video streams 1 and 2 would be rendered on the display screen, and would appear prominently, but with equal visibility.

Figure 5:
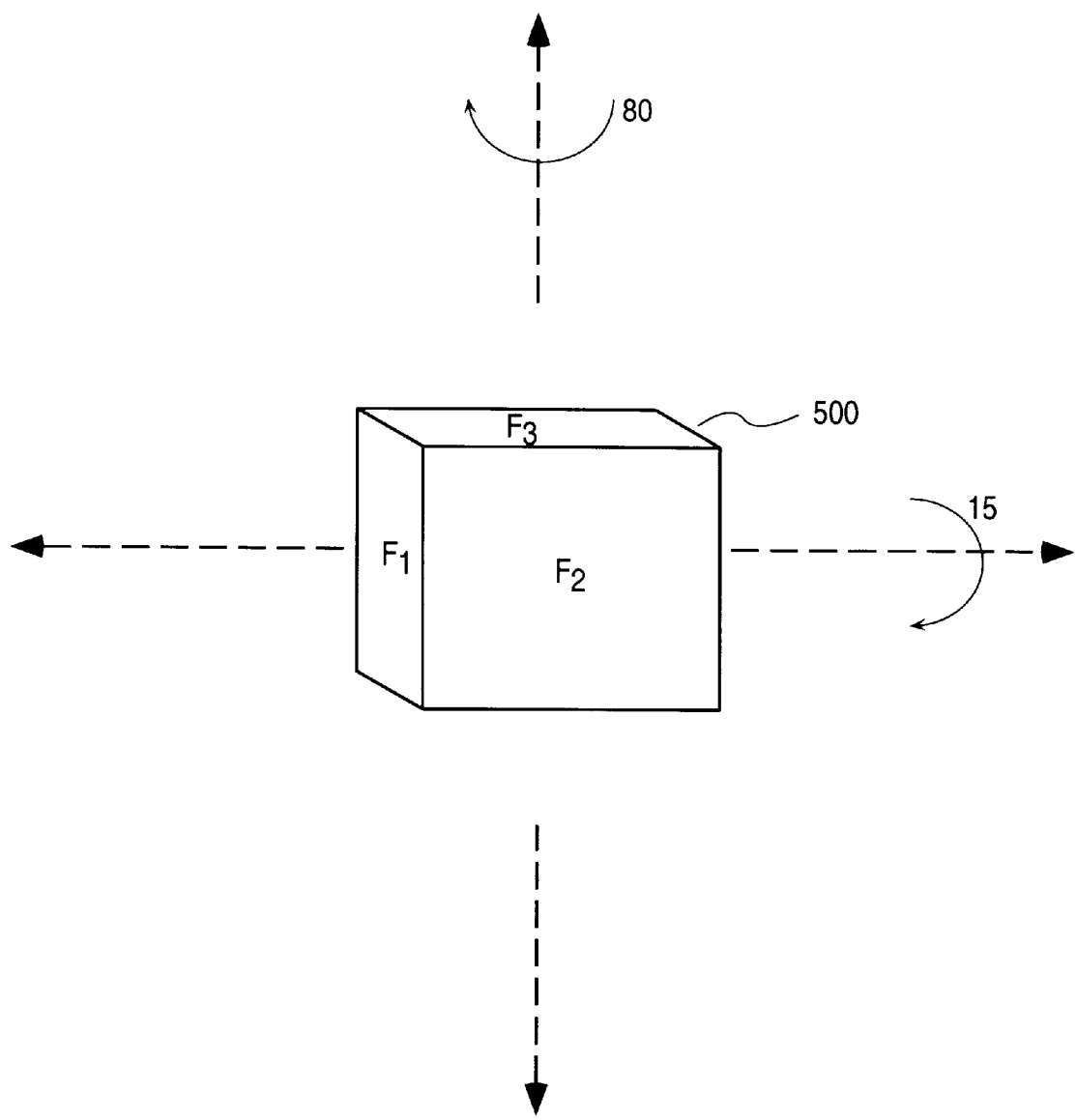
FIG. 5 shows a third orientation of a browse polyhedron.

FIG. 5 shows yet another orientation 500 for the polyhedron which has modified both x-axis and y-axis rotations from that shown in orientation 300 of FIG. 3. Orientation 500 has a rotational pair of [15,80] indicating a rotation about the x-axis of 15 degrees downward and left-wise about the y-axis 80 degrees from rotational origin. At orientation 500, the faces $F_1$, $F_2$ and $F_3$ are visible, but with differing visibility percentages in terms of occupied screen area. Face $F_2$ appears most prominently and thus, has the highest percentage of visibility. Face $F_1$ is ranked next among the visible faces in visibility and face $F_3$, while visible, is only marginally so. In orientation 500, video stream 2, which is assigned to face $F_2$ (see Table 250 of FIG. 2) will dominate the display screen while video streams 1 and 3 will have less prominence. The advantage of using a three-dimensional object to browse multiple video streams evident in FIG. 5 is that while fully viewing one video stream (video stream 2), a user may still keep a watchful eye on two other video streams (video streams 1 and 3). In orientation 500, faces $F_4$, $F_5$ and $F_6$ still remain hidden from view.

Figure 6:
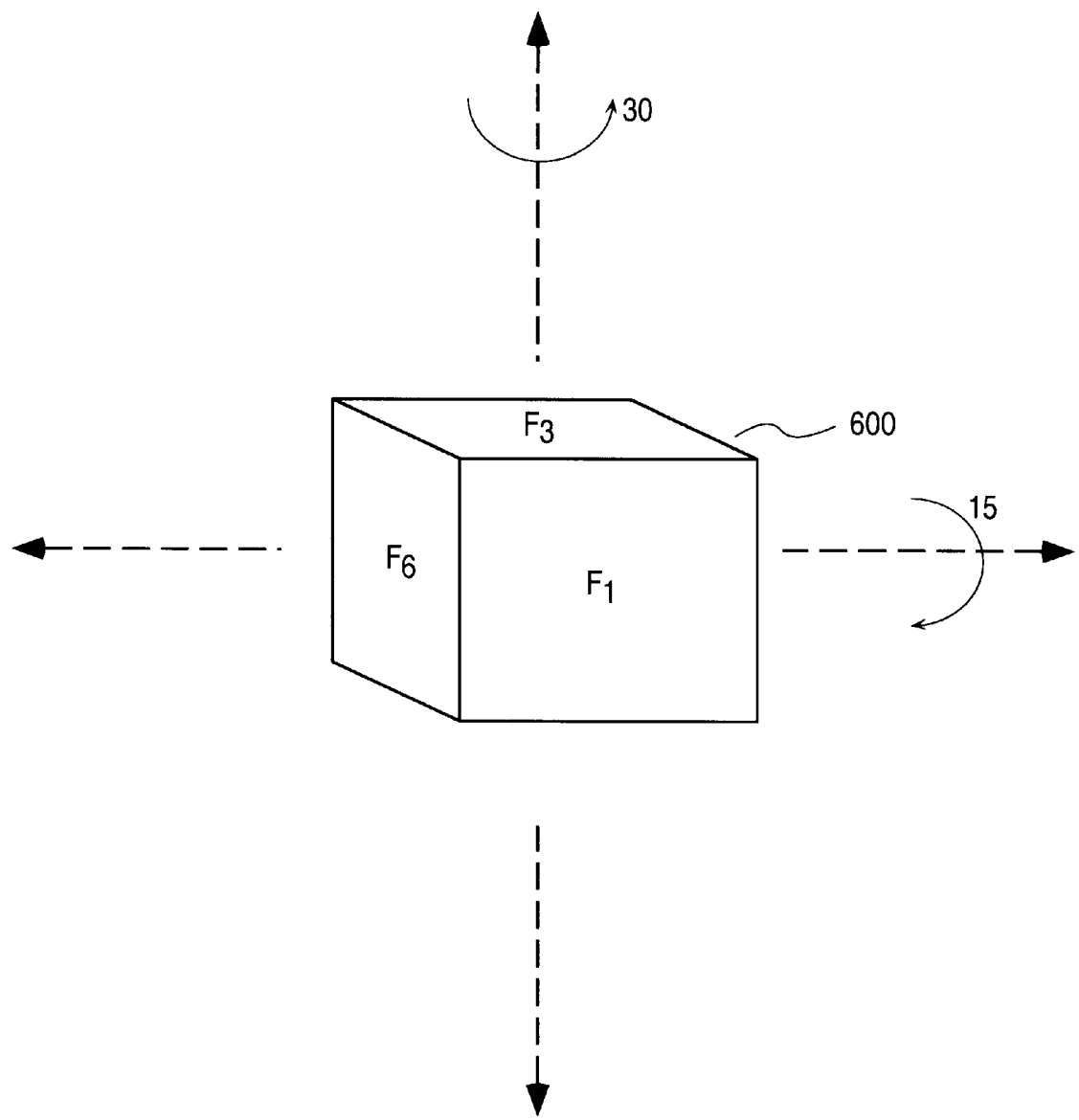
FIG. 6 shows a fourth orientation of a browse polyhedron.

FIG. 6 shows a fourth orientation of the browse polyhedron. In this orientation 600, a rotation angle pair of [15, −30] is shown indicating a 15 degree downward rotation about the x-axis and a rightward rotation about the y-axis of 30 degrees. A negative angle value, according to the convention set forth above, for the y-axis implies a rightward rotation. In orientation 600, faces $F_1$ and $F_3$ are visible as well as face $F_6$. Looking up the multimedia assignment table 250 of FIG. 2, face $F_6$ has no multimedia stream associated with it and therefore, in one embodiment, will appear blank and thus, the browsing system will texture map no video stream upon it. In an alternate embodiment, even though no distinct video stream is defined for face $F_6$, the browsing system will render the video stream of the face opposing it (face $F_5$ and video stream 5) or one of the faces adjacent (face $F_2$ and $F_4$) if any of those faces have video streams assigned them. Geometrically, only two rotation angles will suffice to browse the polyhedron, and any of the six faces, alone or in combination.

Figure 7:
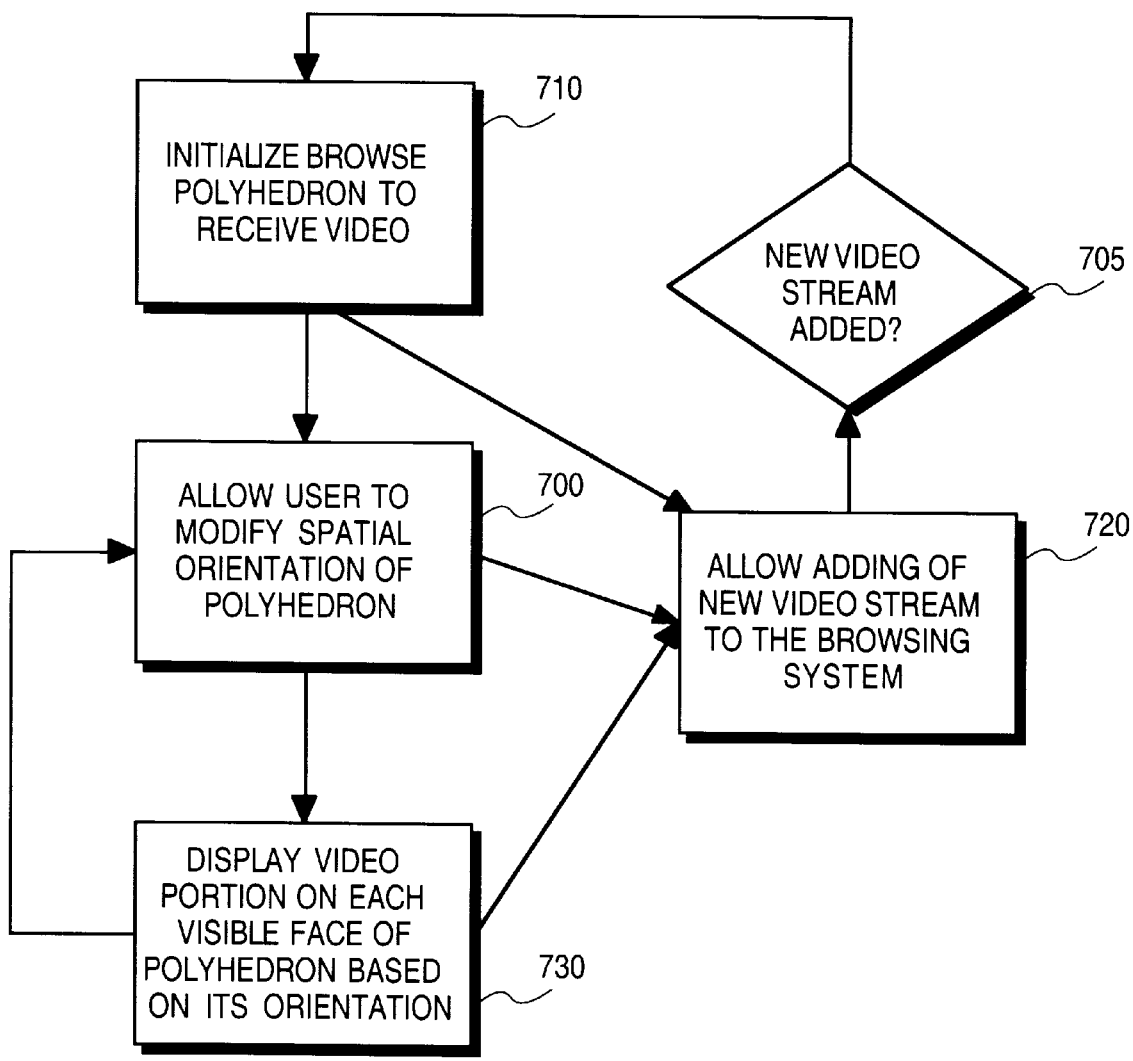
FIG. 7 is flowchart of the browsing method according to one embodiment of the invention.

FIG. 7 is a flowchart of the browsing method according to one embodiment of the invention.

The screen shots of the browsing system shown in FIGS. 1 and 2 are implemented as follows. According to step 710, the browse polyhedron can be initialized to receive video streams of multimedia data. The browsing system, as described above, allows the adding of many video streams, the number limited only by practicality. The browse polyhedron may be chosen initially by the browsing system to be a cube, which, by virtue of having six faces is capable of displaying six video streams. In general, given N multimedia (video) streams, the browse polyhedron chosen would have N faces with a floor of a tetrahedron (four faces) for any less than five video streams. If four video streams were already chosen to be browsed and a fifth were added, the browsing system would draw a cube having six faces, for computational simplicity and viewability rather than an asymmetrical five-faced structure. The browse polyhedron may therefore be chosen dynamically depending upon the number of video streams being browsed. FIG. 7 shows such an operation in step 720 which allows a user to add/modify a video stream. If an addition or modification to the video streams is requested by the user (step 705), then the initialization step 710 repeats.

A further step of initialization is to assign each user added video stream to a particular face of the browse polyhedron. This assignment can then be stored in a table or array for access when rendering information is desired. The browse polyhedron will then be displayed in a initial spatial orientation with at most N/2 faces visible in the initial orientation. If a cube is chosen as the browse polyhedron, then the initial orientation will show three visible faces, each with an equal percentage of screen area, which under the convention of FIG. 2, would correspond to an x-axis and y-axis rotation pair of [45,45]. If a video stream is added and/or an existing one deleted (step 705), the table will be updated appropriately.

Once the polyhedron is initialized, the user may at any time modify the spatial orientation of the polyhedron (step 720). The user may do so by preselecting certain orientations or specifying, through some input device, a rotation value for rotating the polyhedron about one or more axes. In the embodiment shown, rotations about the x-axis and y-axis have been used to describe the invention, but the choice is exemplary as any two axes will suffice to give the browsing system the capability to browse the polyhedron fully. Also, FIG. 1 shows a user interface of buttons to define incremental changes in the direction and amount of rotation but the choice is merely exemplary as it can be readily implemented using a freehand mouse rotation interface rather than buttons. Also, rather than the user browsing the polyhedron, the browsing system may have an automatic mode where the polyhedron rotates (changes orientation) without user intervention. In such an automatic mode, the user may be able to stop the rotation when a desired view is reached.

Whether or not spatial orientation has been modified, the browsing system will display each video stream on the appropriate face in accordance with the spatial orientation of the polyhedron (step 730). While one face may be more prominent, another face, though visible, may be smaller and distorted. The details of the display routine are outlined in FIG. 8.

Figure 8:
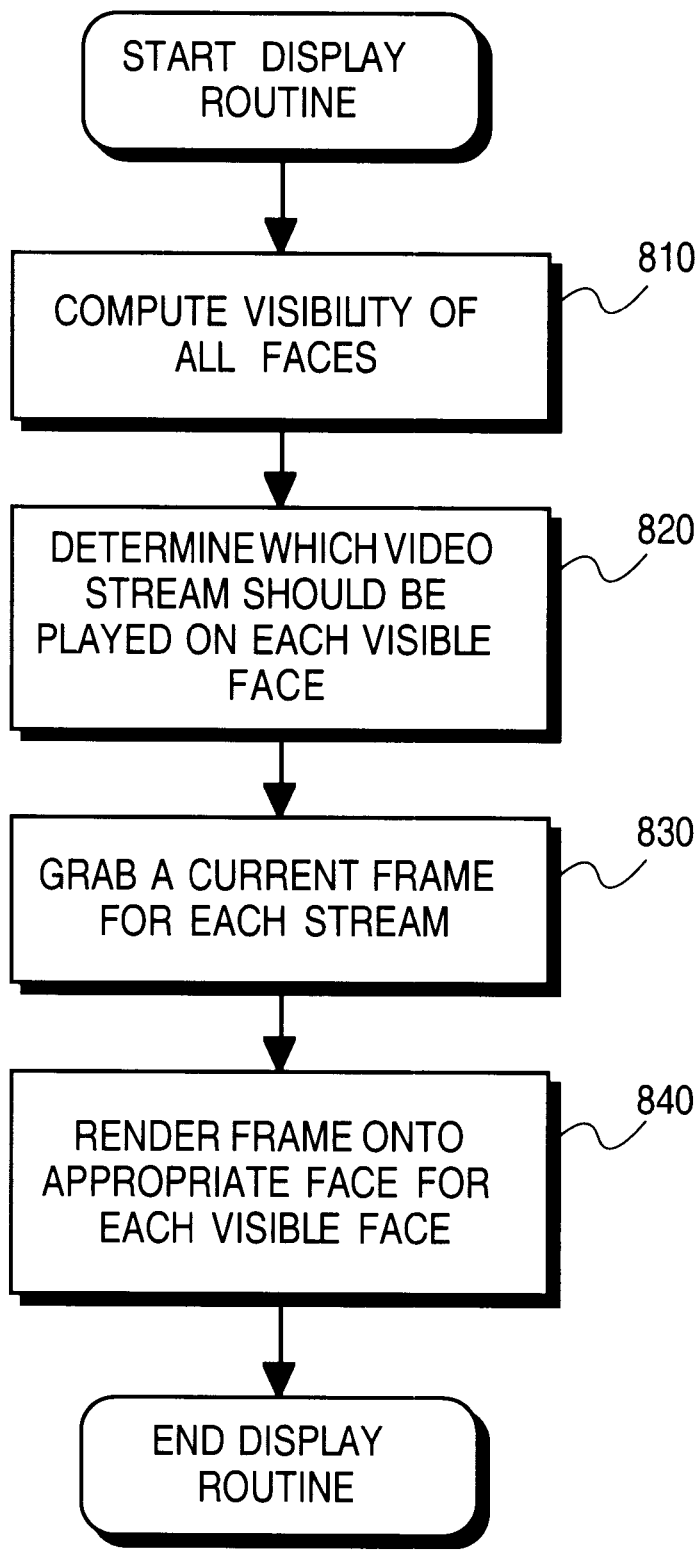
FIG. 8 is a flowchart of the display routine of FIG. 7 according to one embodiment of the invention.

FIG. 8 is a flowchart of the display routine of FIG. 7 according to one embodiment of the invention.

The first step in the display routine, step 730 of FIG. 7, is to compute, based on the spatial orientation, which faces are visible faces (step 810 of FIG. 8). This computation involves transforming the coordinates of each vertex based on the rotation angle pair in relation to the rotational origin. As described in FIG. 2, the rotational origin is said to have a 0 degree left and right rotation and a 0 degree up and down rotation which would leave visible only face $F_1$ (vertices $V_1$, $V_2$ $V_3$ and $V_4$). The mathematical details of computing the visibility of faces is set forth in FIG. 9 and the associated description below.

Once the visible faces are determined (and their visibility computed), then the browsing system can determine which video stream belongs with each visible face (step 820). This is accomplished by looking up the assignment table which identifies a video stream for each face. Next, according to step 830, a multimedia player (media control interface (MCI)) on the computer will grab a current frame from the video stream, apply the appropriate code for decompression and present a graphics frame to the browsing system. One skilled in the art of imaging will be readily able to perform step 830 since frame extraction and decompression of a video stream is well-known in the art. When a frame for a particular face has been grabbed, it is rendered (texture mapped) onto the face to which that video stream is assigned (step 840). The texture mapping is performed according to the transformed vertex coordinates computed for each face. Steps 810 and 840 are described in greater depth in FIGS. 6 and 7, respectively.

A further feature of the invention is the ability to recognize when an image would appear upside-down based on the rotation angle and when rendering, the ability to flip the image right-side up. The recognition is based on identifying upside-down textures. One solution is to check the mapping of the texture. For each face, each vertex has a texture coordinate that identifies a point on the texture map. The collection of all vertices on a given face would select/ identify the entire texture. When rendering the multimedia as a texture, the texture coordinate can be checked for the corresponding vertices to determine the orientation. By sorting the vertices according to vertical position, the orientation of the texture map can be determined by the order (ascending or descending) of the corresponding texture coordinates.

Another solution is to continuously rotate the texture to maintain an upright texture. The angle of a given face can be computed in terms of its offset from vertical alignment, and the texture coordinates are then rotated to make the texture upright. With such a solution, the rotated face may not occupy the entire face unless magnified.

Figure 9:
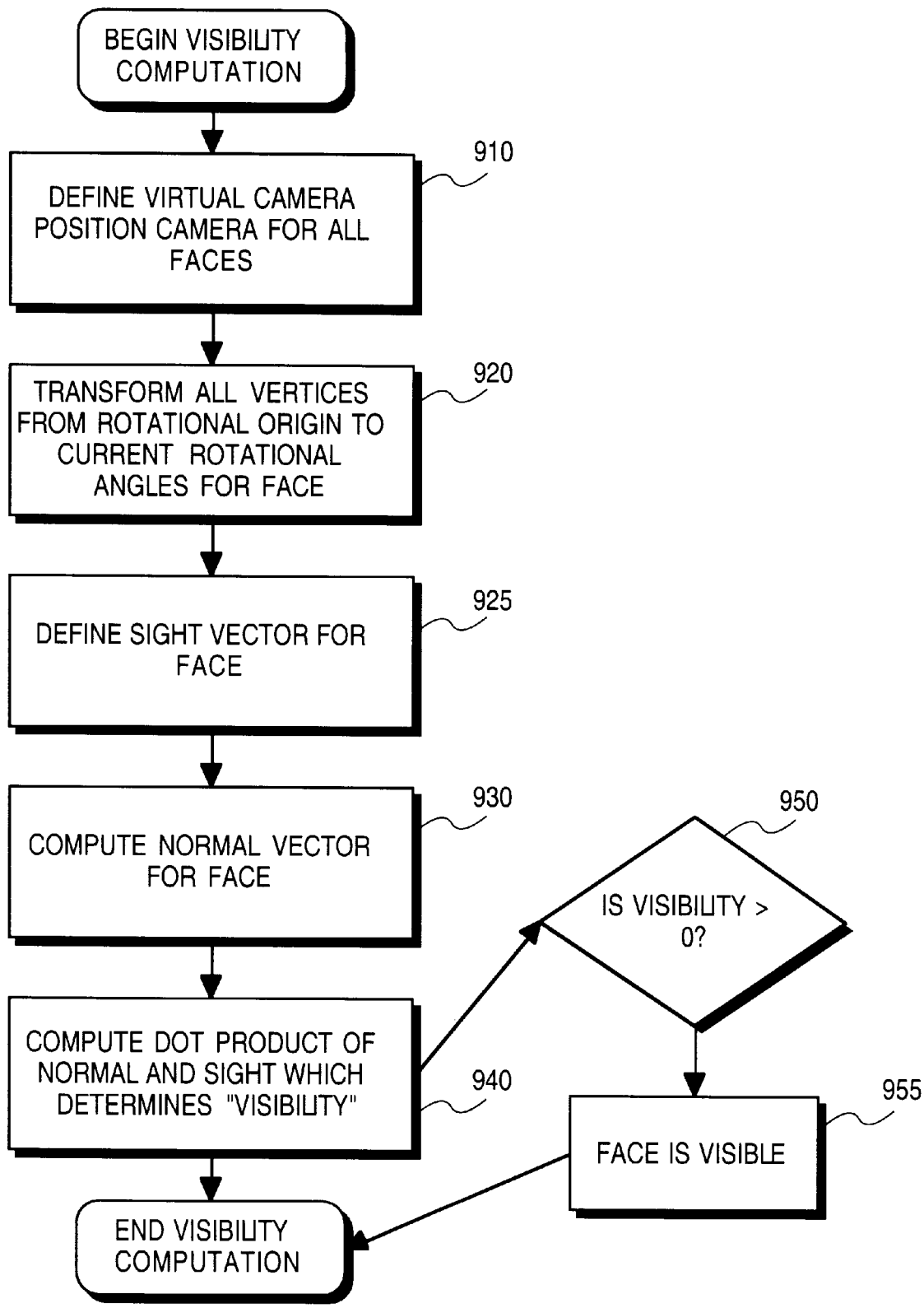
FIG. 9 is a flowchart of computing visible faces according to one embodiment of the invention.

FIG. 9 is a flowchart of the computing visible faces step of FIG. 8 according to one embodiment of the invention.

The first step 910, which may already have been performed during the step 710 of initializing the browse polyhedron shown in FIG. 7, is to define a "virtual camera" position CAMERA as a viewpoint reference from which all computations are made. The virtual camera may be static for all rotations once the polyhedron is initiated or change from rotation angle pair to rotation angle pair. For instance, the position CAMERA can be chosen as a point in space which is the endpoint of a normal of the first face from the exact geometric center of the face. The first face, according to the convention described in FIG. 2, is always visible at the rotational origin [0,0], and thus, the rotational origin of the browse polyhedron is ideal in determining the position CAMERA.

According to step 920, all of the vertices $V_k$ of the polyhedron can be transformed according to the current rotational angle pair. For a given rotational pair, each vertex of the polyhedron has a corresponding "transformed" set of coordinates relative to the two-dimensional display screen. The vertices are transformed from the coordinates assigned them at rotational origin by computing a "rotation" which is well known in the art of computer graphics. The rotation operation uses the rotational angles specified by the current rotational angle pair. The rotational transformation can be performed in several steps. First, rotation matrices are generated for each of the axes. The two rotation matrices are concatenated (by matrix multiplication) to produce a composite rotation matrix. Third, each vertex is multiplied against the composite rotation matrix to produce the transformed vertex. Such transformations are well-known in the art of computer graphics. The transformed vertex for a given vertex $V_k$ of a given face $F_n$ is expressed as $VT_{nk}$.

For a given face $F_n$, a vector SIGHT is defined as from the first transformed vertex $VT_{n1}$ of the face and the position CAMERA ($VT_{n1}$−CAMERA=SIGHT) (step 925).

In addition to computing the SIGHT for face $F_n$, the normal of the face is also computed (step 930). The NORMAL of a face $F_n$ is defined as the cross product of two vectors T and U that lie in the plane of the face. The vectors T and U are defined by the first untransformed vertex $V_{n1}$ for a given face Fn and the second and third transformed vertices $VT_{n2}$ and $VT_{n3}$, respectively, according to the following formula: $U=VT_{n2}-V_{n1}$ and $T=VT_{n3}-V_{n1}$. The vector NORMAL of face $F_n$ then is determined by computing U X T (where X is the cross product operation).

Once the NORMAL vector and SIGHT vector are determined, the "visibility" of a face $F_n$ is computed as the dot product of the NORMAL vector and the SIGHT vector (step 940). If the visibility is greater than zero, the face is said to be visible (steps 950 and 955). If the visibility is not greater than zero, the face is hidden. For a given face, the visibility is a number representing the percentage of area or prominence of the face when rendered on the screen. Both the dot product and cross product operations in three dimensions are well-known mathematical constructs and will not be discussed in detail.

For every visible face $F_v$, the face is rendered on the display according to its transformed vertices $VT_{v1}$, $VT_{v2}$, $VT_{v3}$ and $VT_{v4}$. The three-dimensional coordinates of the transformed vertices are then mapped to specific pixel location on the display screen. Each frame of video from the video stream assigned for the visible face is texture mapped or undergoes a skewing and distortion depending on those vertex coordinates and is rendered using texture mapping techniques which are well-known in the art. The quadrilateral formed by the four mapped vertices will determine how the video for that face is to be textured onto the face.

Figure 10:
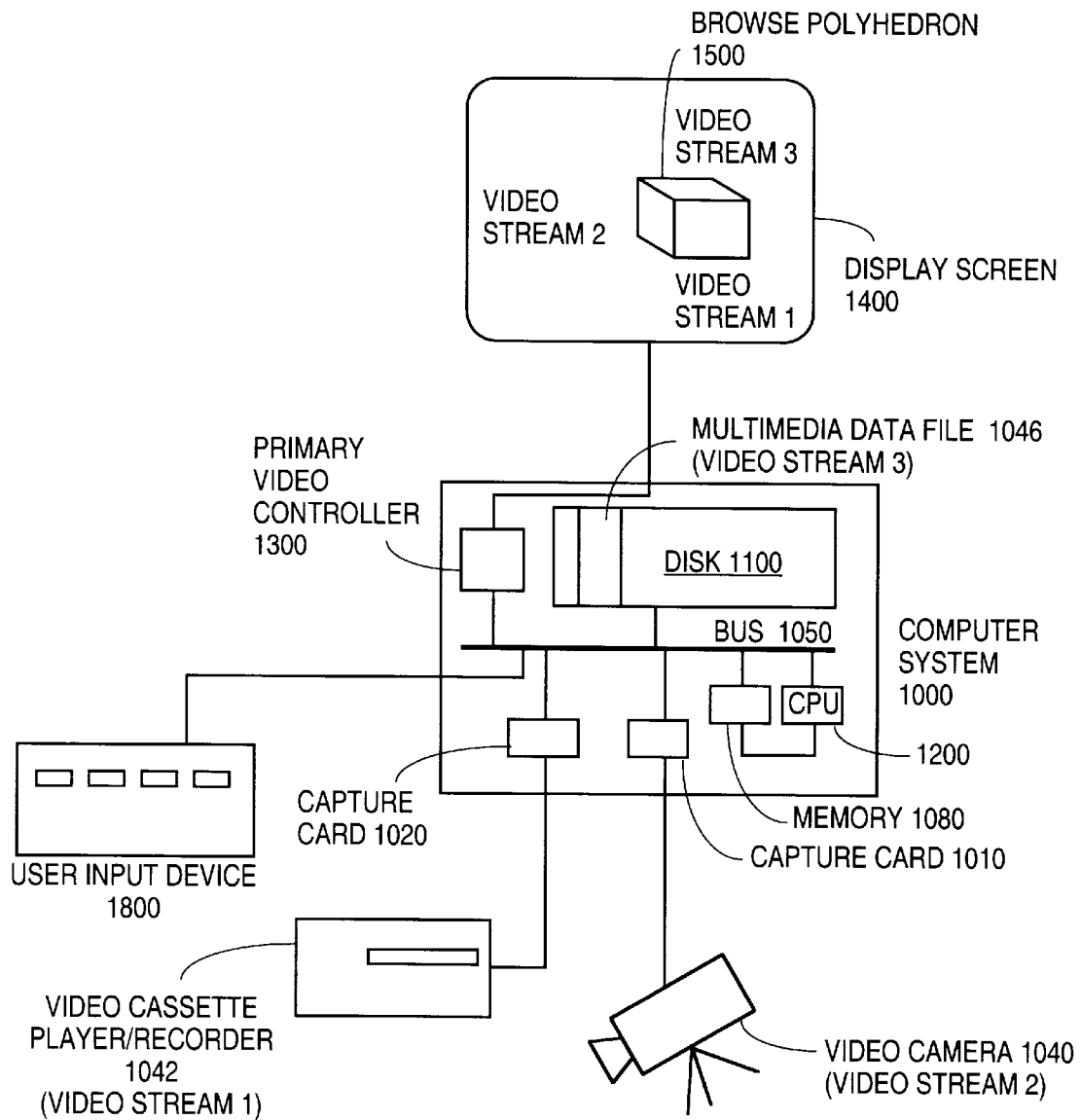
FIG. 10 is a diagram of a browsing system according to one embodiment of the invention.

FIG. 10 is a diagram of a browsing system according to one embodiment of the invention.

FIG. 10 shows a computer system 1000 which is capable of processing data connected to a display screen 1400. FIG. 10 also shows a video cassette player/recorder 1042 which represents a first video stream connected to computer system 1000 through a capture card 1020. Capture card 1020 allows the video stream from VCR 1042 to be captured and played (VCR) by the computer system 1000. Likewise, a second video stream originates from a video camera 1040 as frames connected to computer system 1000 through another capture card 1010. Though each video stream is shown connected to separate capture cards, a single capture card may suffice if it has the input jacks and processing power needed to capture two video streams simultaneously. Additionally, the CPU can process video input to the computer system 1000 and relieve other components of having to process video frames.

A disk 1100 is shown coupled to computer system 1000 which contains an animated multimedia data file 1046 which may be a MPEG file. The data file 1046, when played, will provide the third video stream to be browsed. Computer system 1000 transacts all processes between the various components shown coupled thereto on a bus 1050. A primary video controller 1300 is coupled to bus 1050 and to computer system 1000 which sends signals to display screen 1400 in the form of pixel data which display screen 1400 can project to a user. A CPU (Central Processing Unit) 1200 coupled to bus 1050 can perform all of the steps sufficient to browse multiple video streams such as computing visible faces and running software providing the user interface for the browsing system.

A browse polyhedron 1500 renders as animated textures the three video streams shown, as well as other video streams which may be added such as television broadcasts from a tuner (not shown) or a second multimedia data file stored on disk 1100. Browse polyhedron 1500 renders the video streams according to its orientation. The rotation values for the browse polyhedron may be provided to computer system 1000 by a user input device 1800 such as a mouse or keyboard. CPU 1200 receives rotation values via bus 1050 and a memory 1080 coupled directly to CPU 1200 and to bus 1050. CPU 1200 executes by computer instruction the desired transformations and vector operations specified in FIGS. 7, 8 and 9 and the associated description and outputs resultant values to memory 1080. Memory 1080 is configured to receive frames of video from each of the video streams and can then store temporarily, if desired, those video frames onto disk 1100. Image data for these frames are manipulated as directed by the orientation of the browse polyhedron (given by rotation values) and output via video controller 1300 to display screen 1400. CPU 1200 is also responsible for generating values utilized to render these frames and to render browse polyhedron 1500 itself.

Figure 11A:
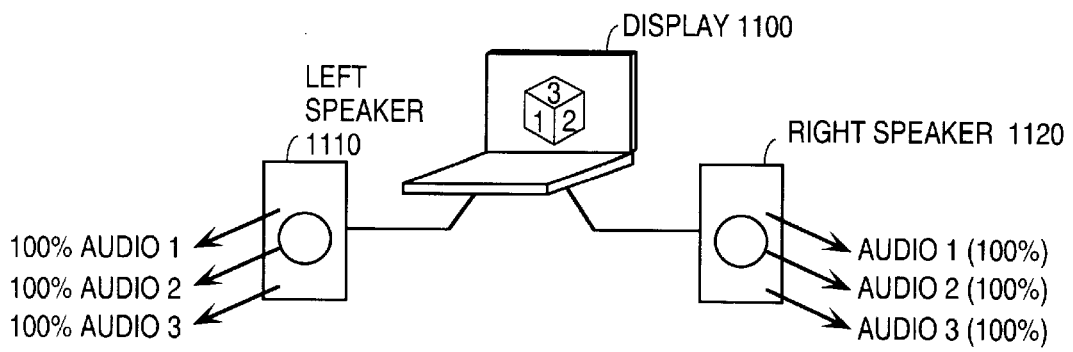
FIGS. 11(a)–(c) show a diagram of guided audio localization according to several embodiments of the invention.
Figure 11B:
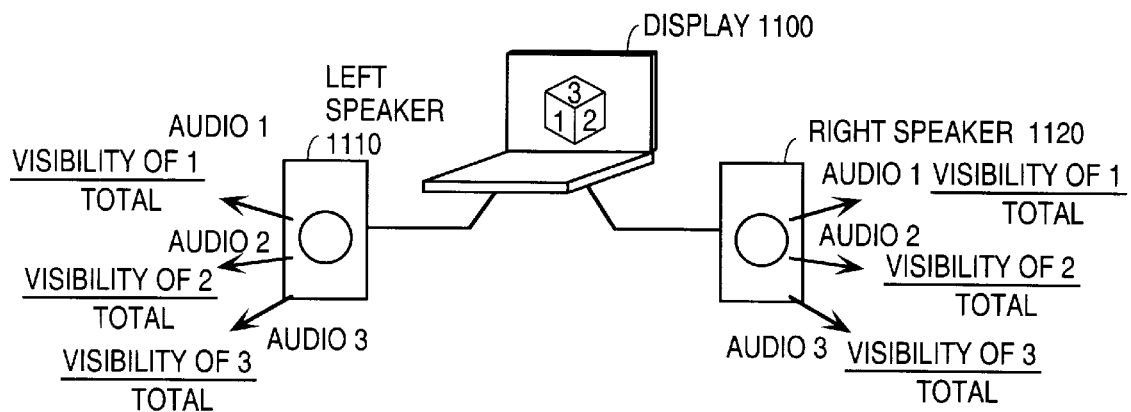
Figure 11C:
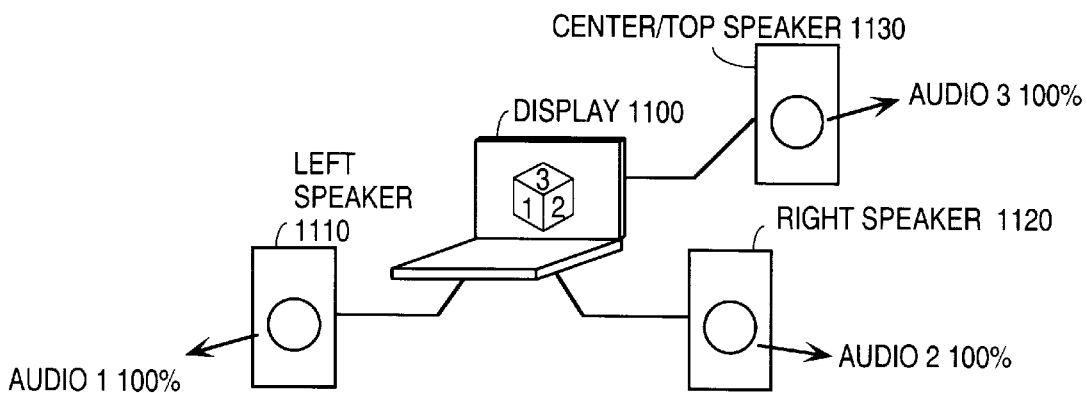

FIGS. 11(*a*)–(*c*) show the localization of audio according to several embodiments of the invention.

A first embodiment, shown in FIG. 11(*a*), for localization of audio involves sending the output of all visible faces (faces 1, 2 and 3) that have accompanying audio streams (audio 1, audio 2 and audio 3) in full with the same intensity. Regardless of the visibility percentage of the accompanying video stream as displayed on display 1100, the full range and volume of the stream is output to the right speaker 1110 and the left speaker 1120.

A second embodiment, shown in FIG. 11(*b*), involves correlating the intensity and range of audio proportional to the percentage of visibility of the face on which the accompanying video stream is rendered. The percentage of visibility is computed by dividing the visibility for a face by the sum of the visibility values for all visible faces (faces 1, 2, and 3) which have accompanying audio streams (audio 1, 2 and 3). According to the percentage of visibility, the audio for each face is sent to speakers 1110 and 1120 in the same percentage. Thus, audio 1 is sent to left speaker 1110 and right speaker 1120 with an intensity equal to the visibility of face 1 divided by the total visibility. Likewise, audio 2 and audio 3 are output with intensities corresponding to the visibilities of faces 2 and 3, respectively, in proportion to the total visibility.

In a third embodiment, shown in FIG. 11(*c*), audio can be directionalized using stereo and/or surround sound channels to send audio to left speaker 1110, right speaker 1120 and top/center speaker 1130, separately. The direction of the normal for the face rendering the video stream accompanying the audio determines whether the audio stream will be sent to the left speaker 1110, right speaker 1120 or center/top speaker 1130. With sound projected in this manner, a true 3-D multimedia effect can be realized for both the video and audio stream in multimedia data. The normal of visible face 1 is shown as outward and to the left; thus, audio 1, the corresponding audio stream, is sent to the left speaker. Likewise, the normal of face 3 can be interpreted as facing up or center and thus, audio stream 3 is sent to the center/top speaker. Many variations of directed localization is possible depending on the number of available audio channels and configuration of speakers present.

All of the audio localization embodiments can be readily implemented by an audio/analog engineer and depend upon the capability of the audio sub-system of the computer or other hardware which is performing the browsing operation. If a computer system does not have surround sound capability, then stereo localization can be employed in the place of surround sound.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method for rendering multimedia data comprising the steps of:

rendering selected ones of a plurality of multimedia data, each of the multimedia data having an independent source, in a plurality of areas of a display screen forming a browse polyhedron, said rendering in accordance with the spatial orientation of said browse polyhedron and repeating the step of rendering in response to change to said spatial orientation.

2. A method for rendering according to claim 1 wherein said browse polyhedron is composed of a plurality of faces.

3. A method for rendering according to claim 2 further comprising the step of:

determining visibility for each one of said faces based on the spatial orientation of said browse polyhedron, wherein a first set of said faces is designated as visible and a second set of said faces is designated as hidden.

4. A method according to claim 3 wherein the step of rendering is performed only on said first set of faces.

5. A method for browsing a plurality of different multimedia sources simultaneously on a single display comprising the steps of:

initializing a browse polyhedron having a plurality of faces on said display to receive a video stream of one said multimedia source, said browse polyhedron having an initial spatial orientation for said browse polyhedron, the spatial orientation of said browse polyhedron indicating which faces are visible and which faces are not visible;

modifying the spatial orientation of said browse polyhedron; and displaying on said display the video stream of an assigned selected multimedia source for each visible face of said browse polyhedron based on the spatial orientation of said browse polyhedron.

6. A method for browsing according to claim 5 wherein said step of initializing includes the step of:

assigning a multimedia source to each face of said polyhedron.

7. A method for browsing according to claim 5 wherein said step of modifying comprises the steps of:

defining user input commands for rotations about a axis of said polyhedron;

allowing a user to select using said input commands a first rotation value for said axis, said rotation values specifying angular rotations for said browse polyhedron about said axis.

8. A method for browsing according to claim 5 wherein said step of displaying comprises the steps of:

computing the visibility of faces based on the spatial orientation of said browse polyhedron, a face with greater than zero visibility defined to be a visible face;

determining, based on said initializing step, which video stream should be displayed for each visible face;

grabbing a current frame of each video stream of each multimedia data source to be displayed;

rendering as an animated texture each said current frame on the visible face assigned for that video stream, said rendering dictated by said visibility and the current spatial orientation of the browse polyhedron.

9. A method according to claim 8 wherein the step of computing the visibility of faces includes the steps of:

defining a virtual viewing position as a reference viewpoint for said browse polyhedron;

transforming vertices of each face from said initial spatial orientation utilizing said x-axis and said y-axis rotation values;

determining a SIGHT vector for each face from a first of said transformed vertices;

computing a normal vector of each face as transformed by said rotation values; and computing a dot product of said normal vector and said SIGHT vector, said dot product equivalent to said visibility.

10. A method according to claim 9 wherein the step of computing a normal vector includes:

determining a first vector from a second of said transformed vertices to a first untransformed vertex;

determining a second vector from a third of said transformed vertices to said first untransformed vertex; and computing a third vector as a cross product of said first vector and said second vector, said third vector defining said normal.

11. A method for browsing according to claim 5 further comprising:

guiding localization of the audio stream accompanying the video stream for each visible face of said browse polyhedron.

12. A system for browsing multiple video streams on a display screen, said system comprising:

a memory configured to receive frames from each video stream;

a processor coupled to said memory and selectively coupled to said display screen, said processor configured to execute instructions for rendering said frames onto a browse polyhedron generated by said processor on said display screen, each video stream assigned a face of said browse polyhedron, said processor configured to receive rotation values for said browse polyhedron, said rotation values defining an orientation for said generation of said browse polyhedron.

13. A system for browsing according to claim 12 further comprising:

a first video source providing a first of said video streams, said first video source coupled to said processor and said memory via a first capture card.

14. A system for browsing according to claim 12 further comprising:

a second video source providing a second of said video streams, said second video source stored on a disk, said disk coupled to said processor and said memory.

15. A system for browsing according to claim 12 further comprising:

a user input device coupled to said processor and said memory, said user input device enabling a user to provide said rotation values for said browse polyhedron.

16. A system for browsing according to claim 12 wherein said rotation values enable said processor to fully rotate said browse polyhedron to expose any hidden faces thereof, each said hidden face capable of having a new video stream rendered thereon.

* * * * *